United States Patent [19]

Tanaka

[11] Patent Number: 4,576,137
[45] Date of Patent: Mar. 18, 1986

[54] GAS-DIESEL DUAL FUEL ENGINE

[75] Inventor: Mitsuo Tanaka, Ibaraki, Japan

[73] Assignee: Yanmar Diesel Engine Co., Ltd., Osaka, Japan

[21] Appl. No.: 757,072

[22] Filed: Jul. 19, 1985

Related U.S. Application Data

[62] Division of Ser. No. 389,093, Jun. 16, 1982, abandoned.

[30] Foreign Application Priority Data

| Jun. 19, 1981 | [JP] | Japan | 56-89486[U] |
| Jun. 19, 1981 | [JP] | Japan | 56-89487[U] |
| Jun. 19, 1981 | [JP] | Japan | 56-89488[U] |
| Jun. 19, 1981 | [JP] | Japan | 56-89489[U] |
| Jun. 19, 1981 | [JP] | Japan | 56-89490[U] |

[51] Int. Cl.⁴ .................................... F02M 39/00
[52] U.S. Cl. ................... 123/575; 123/357; 123/276; 123/300
[58] Field of Search ........... 123/357, 299, 300, 276 E, 123/575, 576, 577, 358, 359

[56] References Cited

U.S. PATENT DOCUMENTS

| 2,502,990 | 4/1950 | Rathbun | 123/276 E |
| 2,678,030 | 5/1954 | Bader | 123/276 E |
| 2,744,511 | 5/1956 | Kauffman | 123/276 E |
| 3,575,146 | 4/1971 | Creighton | 123/299 |

Primary Examiner—Carl Stuart Miller
Attorney, Agent, or Firm—Henry Sternberg; Bert J. Lewen

[57] ABSTRACT

A gas-diesel dual fuel engine operative with both a gaseous fuel and a diesel fuel oil. The engine has an electronic governor circuit adapted to receive both a speed signal representing actual speed of engine and a set speed signal representing a predetermined command speed of the engine, electric actuators adapted to actuate a diesel fuel injection pump and a gaseous fuel regulating valve, respectively, in response to the signal from the electronic governor circuit, and a mode switching control circuit connected to the electronic governor circuit and adapted to switch the operation of the electric actuators between a diesel fuel operation mode and a gaseous fuel operation mode.

3 Claims, 4 Drawing Figures

GAS-DIESEL DUAL FUEL ENGINE

This is a divisional of co-pending application Ser. No. 389,093 filed on June 16, 1982, now abandoned.

The present invention relates to a gas-diesel dual fuel engine in which a diesel engine is additionally equipped with a gaseous fuel supply system and, more particularly, to a governing and controlling device for switching between two kinds of fuel.

Most of conventionally used governing and controlling devices for gas-diesel dual fuel engines are of mechanical types employing link mechanisms in their essential parts. Namely, in a typical conventional governing and controlling device of the kind described, a mechanical-hydraulic or electric-hydraulic governor as the speed governing means is operatively connected to a diesel fuel injection pump and also to a gaseous fuel regulating valve through a link mechanism (fuel changeover means) having a plurality of nodes each being serveable as a fulcrum. In operation, one of the nodes of the link mechanism is selectively fixed by a separate hydraulic cylinder so that the diesel fuel injection pump solely is controlled by the governor output while the gaseous fuel regulating valve is kept closed to operate the engine with the diesel fuel. On the other hand, for operating the engine with the gaseous fuel, another node is fixed to serve as the fulcrum so that the gaseous fuel regulating valve solely is controlled by the governor output while the rack of the diesel fuel injection pump is locked to provide a predetermined pilot injection rate.

The coventional device incorporating the link mechanism of the type mentioned above has suffered the following disadvantages.

(1) Since the switching between diesel fuel and the gaseous fuel is made mechanically by the link mechanism, the construction is complicated impractically and a troublesome maintenance work such as supply of lubricant is necessary. In addition, troubles are liable to be caused due to the use of a large number of movable parts.

(2) The speed governing and the switching of fuel have to be made overcoming the frictional forces generated in various frictional parts in the link mechanism, so that the governor is required to generate a large drivng power. In general, it is necessary to employ an expensive hydraulic governor.

(3) Friction, backlash and deformation in various parts of the link mechanism are inevitable, which in turn increases the tendency of hunting in the controlling operation. This makes it difficult to increase the precision or gain of the control.

(4) Generally speaking, it is not easy to vary the control constants of the link mechanism such as link length, spring constants and so forth. Therefore, the conventional device could not have enough adaptability or flexibility to the change of factors such as the component of the gaseous fuel used.

Accordingly, it is a primary object of the invention to provide a governing and controlling device for gas-diesel fuel engines which has a simple construction to facilitate the maintenance while reducing the occurrence of troubles, thereby to overcome the problems in the conventional device incorporating a link mechanism.

To this end, according to the invention, there is provided a gas-diesel dual fuel engine having a diesel engine, a gaseous fuel supply system, and a governing and controlling device for governing the speed of the engine and controlling the switching between diesel fuel operation mode and gaesous fuel operation mode, the device comprising: an electronic governor circuit adapted to receive both of a speed signal representing the operating speed of the diesel engine and a set speed signal representing the set speed of the engine; electric actuators adapted to actuate a fuel injection pump for the diesel fuel and a gaseous fuel regulating valve in the gaseous fuel supply system in response to the output from the electronic governor circuit, respectively; and a mode switching control circuit connected to said electronic governor and adapted to switch the operation mode of the electric actuator for the diesel fuel injection pump and the actuator for the gaseous fuel regulating valve either to a diesel fuel operation mode or to a gaseous fuel operation mode.

By way of example only, certain illustrative embodiments of the invention will now be described with reference to the accompanying drawings in which.

Figure 1:
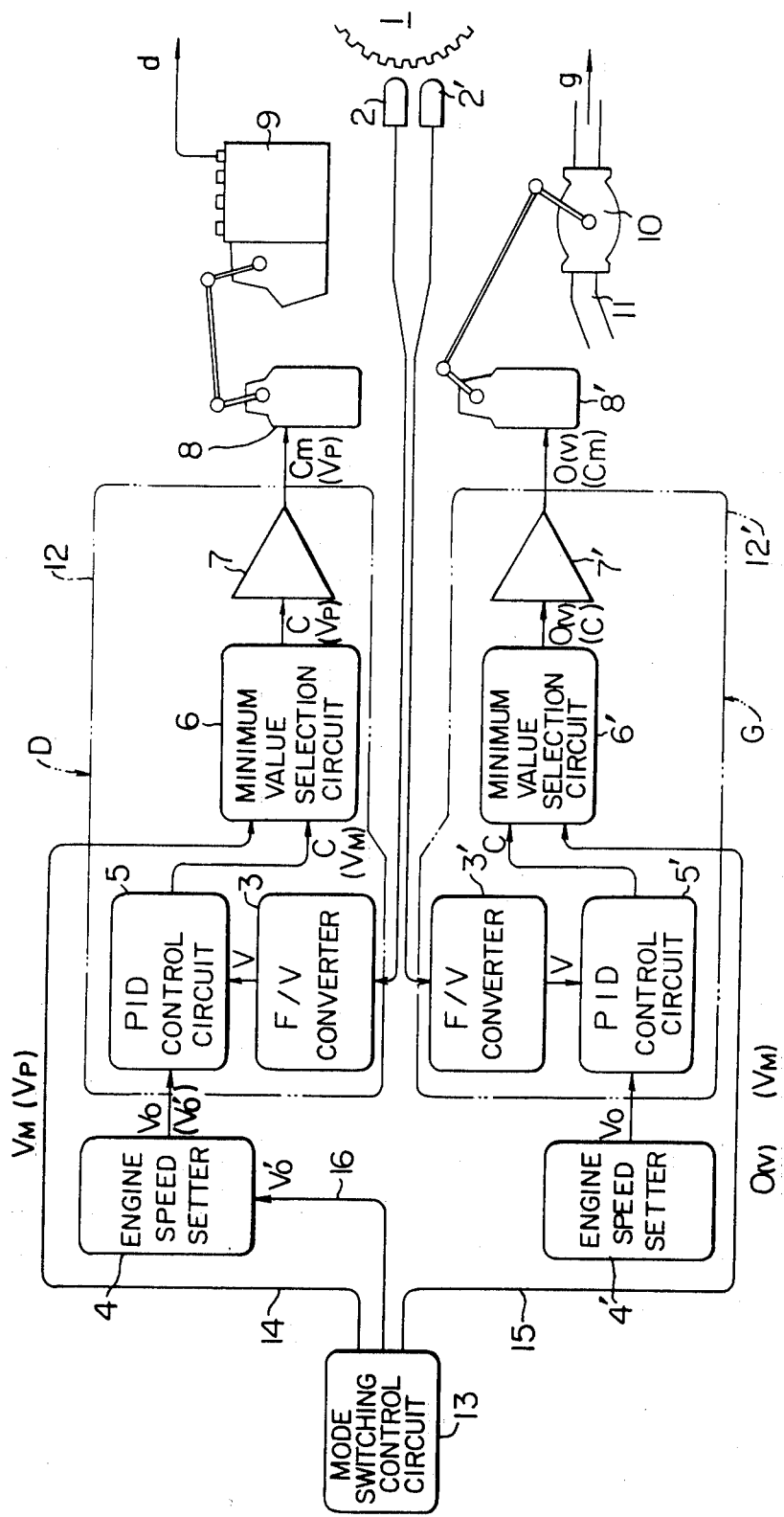
FIG. 1 is a schematic block diagram of a governing and controlling device in accordance with an embodiment of the invention.

Referring first to FIG. 1 schematically showing a governing and controlling device in accordance with an embodiment of the invention, a diesel engine (not shown) has a gear 1 mounted thereon and adapted for use in the detection of operating speed of the engine. Reference numerals 2,2' denote revolution sensors, 3,3' denote F/V (frequency-voltage) converters, 4,4' denote engine speed setters 5,5' denote PID (proportional plus integral plus differential) control circuits, 6,6' denote minimum value selection circuits, 7,7' denote modulation amplifier circuits, 8,8' denote servo solenoid actuators, 9 denotes a fuel injection pump, 10 denotes a gaseous fuel regulating valve disposed in the gaseous fuel supply system 11, 12,12' denote electronic governor circuits and 13 denotes a mode switching control circuit. Namely, the gas-diesel dual fuel engine of the invention has a dual system consisting of a diesel fuel system (shown at the upper side of FIG. 1 and represented by D) and a gaseous fuel system (shown at the lower part of FIG. 1 and represented by G).

A

The diesel fuel mode operation of the dual fuel engine of the embodiment having the governing and controlling device having the described construction will be explained hereinunder.

In this case, it is necessary that the gaseous fuel regulating valve 10 is kept fully closed . To this end, the mode switching control circuit 13 delivers a O(V) signal through an output line 15 to the minimum value selection circuit 6' of the gaseous fuel system G. In consequence, the output from the PID control circuit 5' preceding the minimum value selection circuit 6' is neglected even if the output has a level greater than 0(V), and the minimum value selection circuit 6' provides an output of 0 (V). As a result, the servo solenoid actuator 8' keeps the value 10 in the fully closed state, so that the gaseous fuel (g) is not delivered to the engine at all.

With the gaseous fuel regulating valve 10 fully closed as stated, the speed of the engine detected by the speed sensor 2 is converted by the F/V converter 3 into a voltage V which is delivered to the PID control circuit 5. On the other hand, a reference voltage Vo corresponding to a predetermined command engine speed is beforehand set in the engine speed setter 4, and is inputted to the PID control circuit 5 for a comparison with the voltage V. The PID control circuit 5 makes a PID (proportional plus integral plus differential) action and delivers an output C to the minimum value selection circuit 6. Meanwhile, an upper limit voltage signal $V_M$ representing the upper limit of the usable voltage is delivered from the mode switching control circuit 13 to the minimum value selection circuit 6 through the output line 14, so that the minimum value selection circuit 6 always outputs the output C from the PID control circuit 5.

Then, after effecting a pulse width modulation amplification through the modulation amplifier circuit 7, the output Cm from the latter is delivered to the servo solenoid actuator 8 to drive the same thereby to make the fuel injection pump 9 supply the diesel fuel (d) to the engine which is not shown.

The speed governing of the engine is effected by shifting the position of the rack of the fuel injection pump 9. The control of the rack position is achieved by controlling the movement of the servo solenoid actuator 8 by means of a signal Cm. Namely, the portion surrounded by two-dots-and-dash line 12 functions as an electronic governor circuit.

B

The gaseous fuel operation mode of the gasdiesel dual fuel engine of the described embodiment is as follows.

In this case, the above-mentioned signal $V_M$ is delivered to the minimum value selection circuit 6' from the mode switching control circuit 13 through the output line 15, instead of the 0 (V) signal. At this time, by making the engine speed setter 4' generate a reference voltage Vo as in the case of the diesel fuel operation mode A, the circuit 12' functions as a perfect electronic governor circuit each portion of which serves in the same manner as that in the diesel fuel operation mode A.

The servo solenoid actuator 8' is driven and controlled by the output signal Cm from the electronic governor circuit 12', so that the gaseous fuel (g) is supplied into the combustion chamber of the engine while the actuation is increasing and decreasing the opening of the gaseous fuel regulating valve 10. In the gaseous fuel operation mode of the engine, however, it is necessary to effect a so-called pilot injection, i.e. to inject a predetermined amount of diesel fuel, in order to ignite the gaseous fuel in the combustion chamber of the engine. To this end, it is necessary to deliver a voltage signal Vp ($<V_M$) corresponding to the pilot injection rate to the minimum value selection circuit 6 of the diesel fuel system through the output line 14, while delivering the aforementioned signal $V_M$ to the gaseous fuel system G from the mode switching control circuit 13 through the output line 15.

Furthermore, in order to prevent the output C of the PID control circuit 5 from coming down below the level of the aforementioned signal Vp, a voltage signal V'o ($>Vo$) is delivered to the engine speed setter 4. In consequence, the PID control circuit 5 continues to deliver a signal for increasing the fuel supply rate, because the voltage V'o is higher than Vo. As a result, the output C is increased to the level of the upper limit $V_M$ due to the integral action. Consequently, the output Vp from the minimum value selection circuit 6 is maintained smaller than $V_M$ so that the aforementioned pilot injection rate is maintained.

In the embodiment described hereinbefore, the mode switching control circuit 13 is constituted by, for example, a circuit for generating any desired voltage. Each of the PID control circuits 5,5' may be constituted by a circuit for addition or subtraction of the voltages V and Vo(V'o), proportional, integrating and differential circuits which receive the output from the first-mentioned circuit and a circuit for adding the outputs from the proportional, integrating and differential circuits.

In the case where the fuel is cut-off in response to the output V from the F/V converters 3,3' when the engine speed has come down below a predetermined speed, it is advisable to deliver the cut-off signal to the minimum value selection circuit 6,6'. It is also possible to add a droop generation circuit to each electronic governor circuit 12,12'. By so doing, it is possible to construct the electronic governor circuit such that the balance speed of the engine is lowered as the load on the engine is increased.

Figure 2:
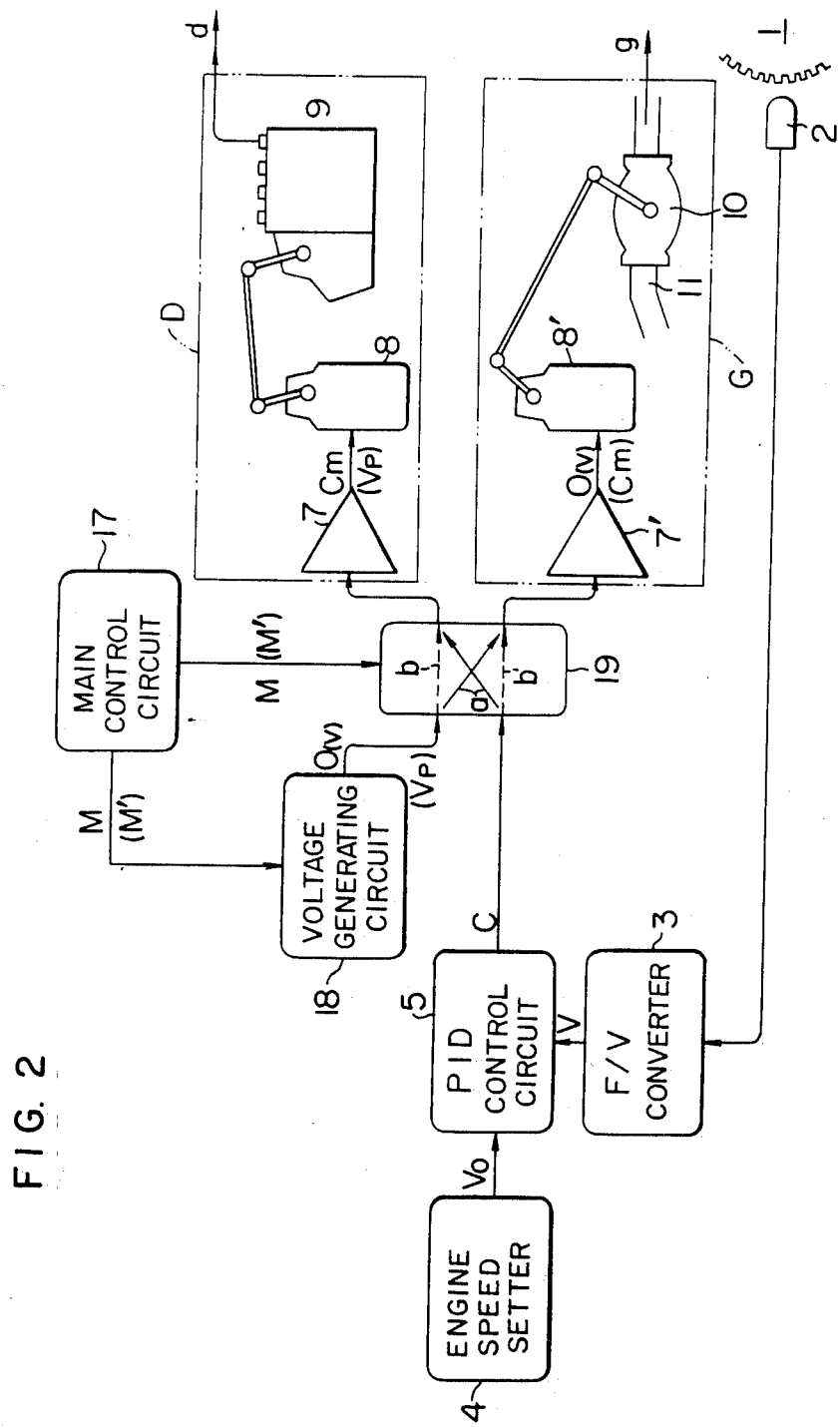
FIG. 2 is a schematic block diagram of a governing and controlling device in accordance with another embodiment of the invention.

A description will be made hereinunder as to a governing and controlling device of another embodiment with reference to FIG. 2. In FIG. 2, a reference numeral 1 denotes a gear provided on the diesel engine (not shown) and adapted for detecting the engine speed, 2 denotes a revolution sensor, 3 denotes an F/V (frequency-voltage) converter, 4 denotes an engine speed setter, 5 denotes a PID control circuit, 17 denotes a main control circuit, 18 denotes a circuit for generating any desired voltage, 19 denotes a mode switching circuit, 7,7' denote modulation amplifier circuits, 8,8' denote servo solenoid actuators, 9 denotes a diesel fuel injection pump, and 11 denotes a gaseous fuel supply system having a gaseous fuel regulating valve 10. The circuit components downstream of the mode switching circuit 19 constituts a dual system consisting of the diesel fuel system D and the gaseous fuel system G.

A

The diesel fuel operation mode of the gas-diesel dual fuel engine of the second embodiment having the above-described governing and controlling device is as follows.

In the diesel fuel operation mode, it is necessary that the gaseous fuel regulating valve 10 is kept fully closed. Therefore, a signal M is delivered from the main control circuit 17 to make the voltage generating circuit 18 produce an output of 0 (V), while connecting the mode of the mode switching circuit 19 as shown by the full line arrows (a). Namely, the 0 (V) signal is delivered to the gaseous fuel system G to keep the servo solenoid actuator 8' fully closed to prevent the gaseous fuel g from being supplied to the engine.

In this state, the revolution sensor 2 senses the engine speed which in turn is converted into a voltage signal V by the F/V converter 3. The output voltage signal V is delivered to the PID control circuit 5. The PID control circuit 5 receives also a reference voltage signal Vo proportional to a predetermined command engine speed and set beforehand in the engine speed setter 4, to make a comparison between the voltage signals V and Vo.

The output signal C produced as a result of the PID action is delivered through the mode switching circuit 19 to the modulation amplifier circuit 7 of the diesel fuel system D.

A pulse width modulation and a current limitation are effected by the modulation amplifier circuit 7 the output Cm of which is delivered to the servo solenoid actuator 8 to drive the same thereby to make the fuel injection pump 9 inject the diesel fuel d to the engine.

The speed governing of the engine is effected by varying the position of the rack of the fuel injection pump 9, which in turn is achieved by varying the movement of the servo solenoid actuator 8 in accordance with the signal Cm. The circuit components down to the modulation amplifier circuit 7 up from the F/V converter function as an electronic governor circuit.

B

The gaseous fuel operation mode of this embodiment is as follows.

In this case, the main control circuit 17 provides an instruction signal M' which is delievered to the voltage generating circuit 18 to make the latter produce a voltage signal Vp proportional to the pilot injection rate of the diesel fuel, while achieving a connection as shown by the broken line arrows (b) for the mode switching circuit 19.

In consequence, the fuel injection pump 9 makes a pilot injection of the diesel fuel (d) at such a rate as to assure the safe ignition of the gaseous fuel (g) in the engine, while the control signal from the PID control circuit 5 is delivered to the gaseous fuel system G to permit the supply of the gaseous fuel (g) to the engine.

In this state, the speed governing of the engine is achieved by increasing and decreasing the opening of the gaseous fuel regulating value 10 by the operation of the servo solenoid actuator 8'. Thus, the circuit components down to the modulation amplifier circuit 7' up from the F/V converter 3 function as an electronic governor circuit.

In the described embodiment, the mode switching circuit 19 can be constituted simply by, for example, a weak current relay, analog switch or the like. The PID control circuit 5 may be constituted by an adding or subtracting circuit for the voltage signals V and Vo, proportional, integrating and differential circuits adapted to receive the output from the adding or subtracting circuit and a circuit for adding the outputs from the proportional, integrating and differential circuits.

From the foregoing description, it will be understood that the combination of the main control circuit 17, voltage generating circuit 18 and the mode switching circuit 19 corrsponds to the mode switching control circuit 13 of the embodiment shown in FIG. 1. It will be understood also that, by adopting the arrangement shown in FIG. 2, the duplicate provision of the revolution sensors 2,2', F/V converters 3,3', engine speed setters 4,4' and the PID controllers 5,5' necessitated in the first embodiment shown in FIG. 1 can be replaced by a singular system.

As will be seen from the foregoing description of two preferred embodiments, according to the invention, there is provided a gas-diesel dual fuel engine having a diesel engine, a gaseous fuel supply system and a governing and controlling device for governing the speed of the engine and controlling the switching between diesel fuel operation mode and gaseous fuel operation mode, the device comprising: an electronic governor circuit adapted to receive both of a speed signal representing the operating speed of the diesl engine and a set speed signal representing the set speed of the engine; electric actuators adapted to actuate a fuel injection pump for the diesel fuel and a gaseous fuel regulating valve in the gaseous fuel supply system in response to the output from the electronic governor circuit, respectively; and a mode switching control circuit connected to said electronic governor circuit and adapted to switch the operation mode of the electric actuator for the diesel fuel injection pump and the actuator for the gaseous fuel regulating valve either to a diesel fuel operation mode or to a gaseous fuel operation mode.

The gas-diesel dual fuel engine of the present invention as so far offers the described following advantages.

(1) The switching between the diesel fuel operation mode and the gaseous fuel operation mode is achieved electrically by the mode switching control circuit, in contrast to the conventional device in which the switching is effected mechanically by a link mechanism or the like. In consequence, the construction is much simplified to facititate the maintenance of the engine. For instance, the supply of lubricating oil can be eliminated completely. In addition, the occurrence of troubles is much reduced because there are almost no mechanical movable parts.

(2) Since the link mechanism is dispensed with, the frictional resistance which is encountered in the conventional system by the link parts of the linkage is reduced remarkably so that the device as a whole is operable with only a small output power of the governor, and the assistance by hydraulic cylinder can be dispensed with.

(3) The elimination of the link mechanism minimizes the back lash in the transmission system so that the factor which would cause the hunting is suppressed to improve the control precision.

(4) It is possible to easily change the control constants such as output from the engine speed setter 4, so that the device as a whole has a sufficient adaptability or flexibility to the change of the components of the gaseous fuel or a change of other factors.

(5) It is comparatively easy to effect a remote control because the switching of fuel and speed governing of the engine are performed wholly electrically.

Figure 3:
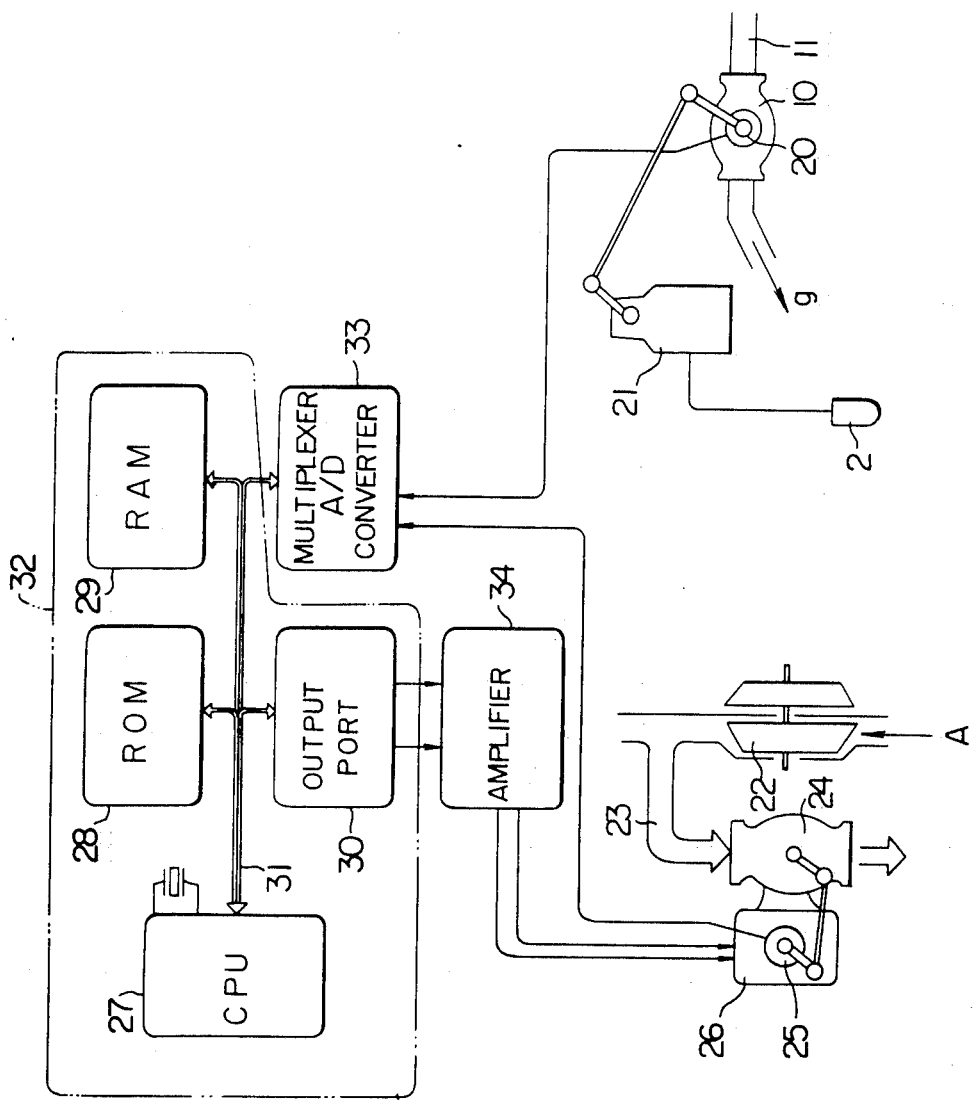
FIG. 3 is a schematic block diagram of an example of an automatic air-fuel ratio controller incorporated in a supercharged gas-diesel dual fuel engine having a governing and controlling device.
Figure 4:
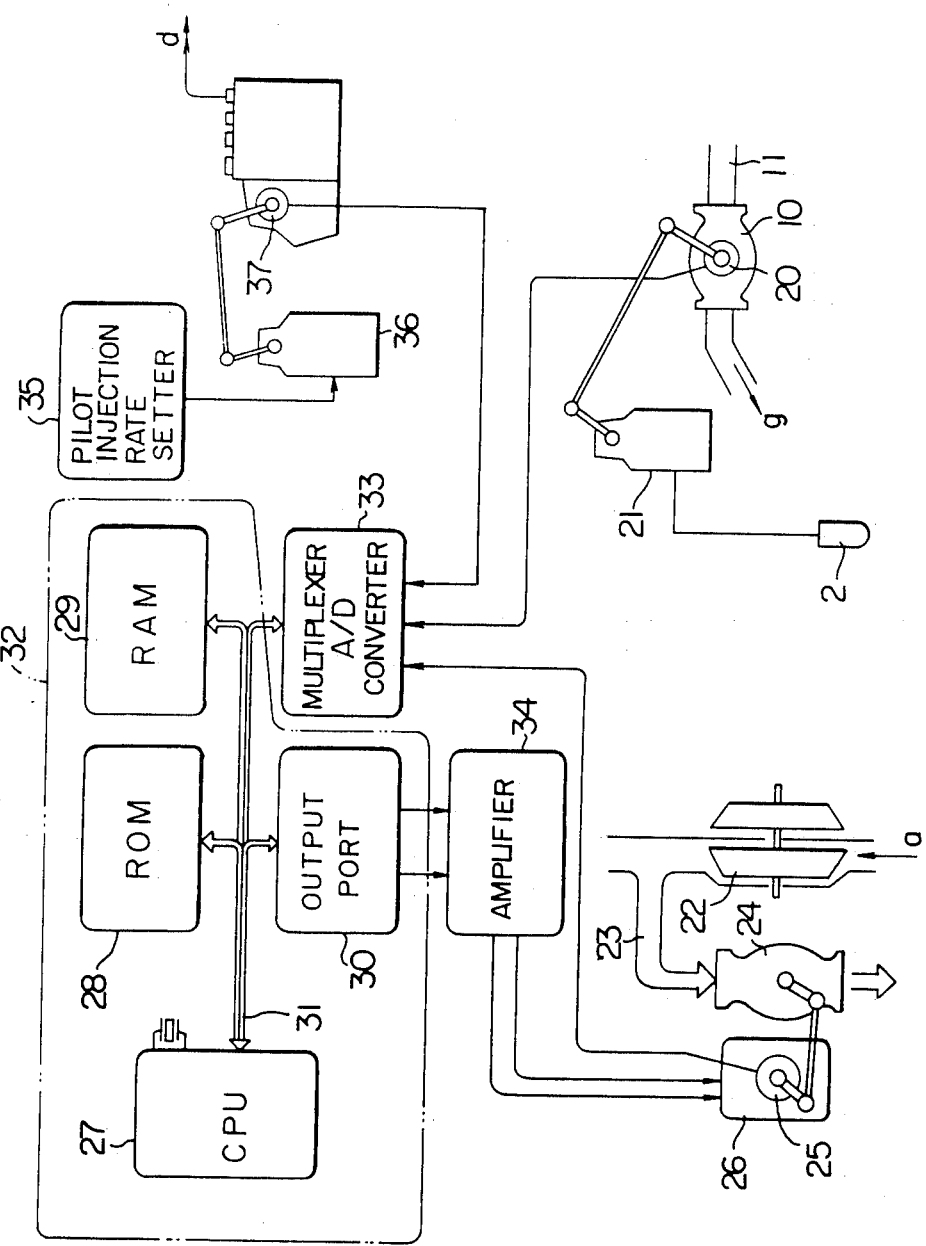
FIG. 4 is a schematic block diagram of another example of the automatic air-fuel ratio controller.

FIGS. 3 and 4 show different embodiments in which a supercharged gas-diesel dual fuel engine, equipped with the governing and controlling device of the invention, is further provided with an automatic air-fuel ratio controller.

In the operation of the gas-diesel dual fuel engine, it is desired to optimize the air-fuel ratio at each load level in order to reduce the fuel consumption and to improve the exhaust emission characteristics, while avoiding the risk of knocking and mis-firing.

To cope with this demand, hitherto a device has been proposed which is adapted to directly introduce the pressure at the outlet of the gaseous fuel control valve to an air pressure amplifier the output of which serves to form a bypass between the suction and discharge sides of the supercharger compressor thereby to adjust the air-fuel ratio.

This conventional system employing a mechanical control by air pressure, however, cannot provide a minute control theoretically, and there is a practical limit in increasing the precision of the control. In addition, this conventional system necessitates a compressed air source as an additional equipment, resulting in a complicated construction and raised cost.

Under this circumstance, present invention aims also at providing a less-expensive automatic air-fuel ratio controller having a simplified construction and capable of achieving a minute and precise control of any desired pattern, thereby to overcome the above-described problems in the prior art employing a pneumatic-mechanical control system.

To this end, according to another aspect of the invention, there is provided a supercharged gasdiesel dual fuel engine comprising a valve opening sensor for sensing the opening of the gaseous fuel regulating valve, an intake air relief adjusting valve provided in an intake air relief port between the supercharger outlet and the intake port of the diesel engine and adapted to be actuated by an electric actuator, a valve opening sensor adapted for sensing the opening of the intake air relief adjusting valve, and means for memorizing and calculating a predetermined relation between the opening of the gaseous fuel regulating valve and the opening of the intake air relief adjusting valve and for increasing and decreasing the opening of the intake air relief adjusting valve in accordance with the signal from the sensor for sensing the gaseous fuel regulating valve.

This embodiment will be explained more fully with reference to FIG. 3 which schematically shows an example of the automatic air-fuel ratio controller.

Referring to FIG. 3, a reference numeral 11 denotes a gaseous fuel supply system added to a diesel engine (not shown), 10 denotes a gaseous fuel regulating valve provided at an intermediate portion of the gaseous fuel supply system, 20 denotes a sensor for sensing the opening of the regulating valve, 2 denotes a revolution sensor for sensing the revolution speed of the engine, and 21 denotes an electronic governor for controlling the opening of the gaseous fuel regulating valve and corresponding to the electronic governor circuit 12' and the actuator 8' of the embodiment shown in FIG. 1. A reference symbol (g) represents the gaeous fuel adapted to be supplied to a combustion chamber (not shown) of the engine. During operation of the engine with the gaseous fuel (g), a pilot injection of the diesel fuel is made at a predetermined rate by a separate means which is not shown.

On the other hand, a symbol A represents the supercharging air, 22 denotes a supercharger compressor, 23 denotes an intake air relief port provided between the supercharger outlet and the intake port (not shown) of the engine, 24 denotes an intake air relief adjusting valve, 25 denotes a valve opening sensor for sensing the opening of the valve 24, and 26 denotes a motor serving as an actuator for actuating the intake air relief adjusting valve 24. The outlet of the intake air relief adjusting valve 24 may be opened to the atmospheric side as illustrated or may be connected to the suction side of the supercharger compressor 22.

A reference numeral 27 denotes a central processing unit (referred to as CPU, hereinunder), 28 denotes a read only memory (referred to as ROM hereinunder), 29 denotes a random access memory (referred to as RAM, hereinunder) adapted to be used for a temporary storage of the detected values, working register during controlling calculation and so forth, 30 denotes an output port and 31 denotes a BUS line including data BUS, address BUS and control BUS.

The above mentioned parts 27 to 30 may be constituted by separate LSIs to form a microcomputer system. It is possible to construct a one-chip microcomputer 32 including the parts 27 to 30 and the BUS line 31 as surrounded by a two-dot-and-dash line. A reference numeral 33 designates a multiplexer A/D converter which is adapted to convert the analog values delivered by the valve opening sensors 20,25 into digital values and to deliver the digital values through the BUS line 31. A reference numeral 34 designates an amplifier constituted by a power transistor or a relay.

The automatic air-fuel ratio controller having the described construction operates in a manner explained hereinunder.

In accordance with the sequence of a program memorized in the ROM 28, the CPU reads the opening of the gaseous fuel opening regulating valve 10 through the A/D converter 33 as the detection signal obtained by the valve opening sensor 20. The CPU then reads the Table stored in the ROM 28 and accommodating data concerning the relationship between the opening of the gaseous fuel regulating valve and the opening of the intake air relief regulating valve, and calculates the opening of the intake air relief adjusting valve 24 corresponding to the present opening of the gaseous fuel regulating valve.

The above-mentioned Table is worked out from the result of the test running of the diesel engine, so that it is necessary to quantize the openings of these two valves. Therefore, the graph corresponding to this Table inevitably has a stepped form. To obviate the unfavourable influence of the steps, the influence of the step height is minimized by increasing the memory capacity of the ROM 28 or taking an interpolation or the like countermeasure during reading of data by CPU 27.

Alternatively, a numerical equation corresponding to the relationship between the openings of the gaseous fuel regulating valve and the intake air relief adjusting valve is stored in place of the above-mentioned Table, so that the CPU makes a calculation at each time of operation to determine the optimum opening of the intake air relief adjusting valve.

Then, the CPU 27 reads the opening of the intake air relief ajusting valve 24 as the detection signal obtained by the valve opening sensor 25 through the A/D converter 33, and compares the detected valve opening with the calculated one.

The CPU 27 provides, in accordance with the result of the comparison, a signal for forward rotation, backward rotation or stopping to the electric actuator 26 through the output port 30 and the amplifier 34, in such a manner as to obtain a coincidence between the detected valve opening and the calculated one after determination of an allowance.

Thus, the opening of the intake air relief adjusting valve is automatically increased and decreased at each moment in accordance with the opening of the gaseous fuel regulating valve 10, through the operation of the memory, operation and outputting means including the aforementioned constituents 27 to 31, thereby to automatically attain a desired air-fuel ratio.

In this embodiment, the valve opening sensors 20 and 25 may be constituted by, for example, potentiometers or the like devices. It is also possible to use, as the electric actuator 26 for intake air relief adjusting valve 24, a servo solenoid actuator in place of the motor used in the illustrated embodiment. The use of the servo solenoid actuator as the actuator 26 ensures a higher response speed. In such a case, it is possible to use a pulse width modulation amplifier as the amplifier 34.

In the air-fuel ratio controller shown in FIG. 4, the rate of pilot injection of diesel fuel is set by a setter 35 which corresponds to the electronic governor circuit 12 of the first embodiment shown in FIG. 1. A reference numeral 36 designates a position controller adapted to receive the output from the setter 35, while a reference numeral 37 designates a position sensor for sensing the position of the rack of the fuel injection pump 9, i.e. the rate of fuel injection. Other portions are materially identical to those shown in FIG. 3 and, hence, the detailed description thereof is omitted here.

This air-fuel ratio controller operates in a manner explained hereinunder.

In accordance with the sequence of the program stored in the ROM 28, the central processing unit CPU 27 reads, through the A/D converter 33, the opening of the gaseous fuel regulating valve 10 and the position of the rack of the fuel injection pump, as the detection signals obtained by the valve opening sensor 20 and the rack position sensor 37. The CPU 27 then reads the data stored in the ROM 28 concerning the relationship between the opening of the gaseous fuel regulating valve 10 and the opening of the intake air relief adjusting valve 20 and the relationship between the position of the rack of the diesel fuel injection pump and the opening of the intake air relief adjusting valve, and calculates the opening of the intake air relief adjusting valve corresponding to the present opening of the gaseous fuel regulating valve and the present pilot fuel injection rate which corresponds to the present position of the rack of the fuel injection pump.

The above-mentioned Table is obtained in accordance with the result of a test running of the diesel engine. Therefore, for storing the data in the ROM 28, it is necessary to quantize the openings of the two valves and the position of the rack. Therefore, the graph corresponding to this Table is inevitablly stepped. In order to eliminate any unfavourable effect of the steps of the characteristics, it is suggested to increase the capacity of the ROM 28 to minimize the effect of the steps or to effect an interpolation during reading by the CPU 27.

Alternatively, a numerical equation corresponding to the relationships between the opening of the intake air relief adjusting valve and the opening of the gaseous fuel regulating valve and the rack position is stored in the ROM 28 in place of the above-mentioned Table, and the CPU 27 makes a calculation in accordance with this equation at each time of operation to obtain the optimum opening of the intake air relief adjusting valve.

Then, the CPU 27 reads the output signal from the valve opening sensor 25 representing the opening of the intake air relief adjusting valve 24, through the A/D converter 33, and compares the detected value with the calculated value mntioned above. In accordance with the result of the comparison, the CPU 27 produces and delivers an output signal through the output port 30 and the amplifier 34 to the electric actuator 26 for forward rotation, backward rotation or stopping of the same, thereby to attain a coincidence between the detected value and the calculated value.

Thus, the opening of the intake air relief adjusting valve 24 is automatically increased and decreased at each moment in accordance with the present opening of the gaseous fuel regulating valve 10 and the present position of the rack of the fuel injection pump 9, through the operation of the memorizing, calculating and outputting means constituted by the constituents 27 through 31.

As has been described, the automatic air-fuel ratio controllers shown in FIGS. 3 and 4 offer the following advantages thanks to their peculiar constructions.

(1) Due to the use of the electronic control system, a higher response speed is attained than the conventional controller adopting the pneumatic control system. In addition, the occurrence of hunting is much reduced and the precision of control is enhanced thanks to the use of an open-loop control system as illustrated.

(2) The program control system employing a numerical Table permits the control of air-fuel ratio in any desired pattern, and can easily and surely meet the demand for change of the composition of the gaseous fuel and so forth.

(3) Large additional equipment such as a compressed air source is eliminated and the construction of the system as a whole is simplified. Also, the reliability is increased and the cost is lowered advantageously.

(4) In the embodiment shown in FIG. 4, it is possible to easily change the pilot injection rate of diesel fuel in response to the change in the rate of generation of the gaseous fuel in the plant, followed by an automatic control of air-fuel ratio to attain the optimum air-fuel ratio, so that the degree of freedom of operation of the engine is increased advantageously.

What is claimed is:

1. In a gas-diesel dual fuel engine apparatus having a diesel engine, a diesel fuel supply system including a diesel fuel injection pump, a gaseous fuel supply system including a gaseous fuel regulating valve, and a governing and controlling device for governing the speed of said engine through the control of fuel supplied to said engine and controlling the switchover of the operation of said engine between a diesel fuel mode and a gaseous fuel mode; the improvement that said governing and controlling device comprises:

(a) at least one electronic governor means adapted to compare a speed signal representing the actual operating speed of said diesel engine with a set speed signal representing the set speed thereof and to perform a proportional plus integral plus differential operation on the basis of the difference therebetween for outputting a control signal according to the difference between said two speed signals;

(b) a pair of electric actuator means having respective power amplifier circuits and mechanically connected to said diesel fuel injection pump and said gaseous fuel regulating valve, respectively, for the actuation thereof;

(c) mode switching control means for controlling the switchover of said governing and controlling device between the engine's diesel fuel operation mode and gaseous fuel operation mode, said mode switching control means being adapted to generate command signals for fully closing said gaseous fuel regulating valve when the engine is in the diesel fuel operation mode and for operating said diesel fuel injection pump to feed said diesel engine with a predetermined amount of a diesel fuel as pilot injection fuel when the engine is in the gaseous fuel operation mode; and (d) signal selecting means connecting said electronic governor means and said mode switching control means to said pair of electric actuator means for selectively delivering said control signal and said command signals, said signal selecting means being controlled by said mode switching control means so that when the engine is in the diesel fuel operation mode, said control signal is delivered to said electric actuator means connected with said diesel fuel injection pump to operate said pump and a command signal is delivered to said electric actuator means connected with said gaseous fuel regulating valve to close said valve, while when the engine is in the gaseous fuel operation mode, said control signal is delivered to said electric actuator means connected with said gaseous fuel regulating valve and a command signal is delivered to said electric actuator means connected with said diesel fuel injection pump to operate said pump for the pilot injection;

(e) said mode switching control means comprising a main control circuit, a voltage generating circuit adapted to receive an instructional signal from said main control circuit to generate any desired voltage for said command signals, and a mode switching circuit connected to said voltage generating circuit and said main control circuit and serving as said signal selecting means, said electronic governor means including a PID control circuit adapted to generate said control signal according to the difference between said speed signal and said set speed signal, said pair of power amplifier circuits being connected to receive the control signal from said PID control circuit through said mode switching circuit, one of said power amplifier circuits being operable in response to an input from said mode switching circuit to produce an output for driving said electric actuator means for said fuel injection pump, and the other power amplifier circuit being operable in response to a different input from said mode switching circuit to produce an output for driving said electric actuator means for said gaseous fuel regulating valve, said mode switching control means being adapted, when the engine is in the diesel fuel operation mode, to deliver the control signal from said PID control circuit to said power amplifier circuit associated with said diesel fuel injection pump while leading the output of said voltage generating circuit, after converting said output of said voltage generating circuit into zero volt, to said power amplifier circuit associated with said gaseous fuel regulating valve, and said mode switching control means being further adapted, when the engine is in the gaseous fuel operation mode, to deliver the control signal from said PID control circuit to said power amplifier circuit associated with said gaseous fuel regulating valve while delivering the output from said voltage generating circuit, after converting said output of said voltage generating circuit into a voltage proportional to the rate of pilot injection of diesel fuel, to said power amplifier circuit associated with said diesel fuel injection pump.

2. In a gas-diesel dual fuel engine apparatus having a diesel engine, a diesel fuel supply system including a diesel fuel injection pump, a gaseous fuel supply system including a gaseous fuel regulating valve, a supercharger, an automatic air-fuel ratio controller, and a governing and controlling device for governing the speed of said engine through the control of fuel supplied to said engine and controlling the switchover of the operation of said engine between a diesel fuel mode and a gaseous fuel mode; the improvement that said governing and controlling device comprises:

(a) at least one electronic governor means adapted to compare a speed signal representing the actual operating speed of said diesel engine with a set speed signal representing the set speed thereof and to perform a proportional plus integral plus differential operation on the basis of the difference therebetween for outputting a control signal according to the difference between said two speed signals;

(b) a pair of electric actuator means having respective power amplifier circuits and mechanically connected to said diesel fuel injection pump and said gaseous fuel regulating valve, respectively, for the actuation thereof;

(c) mode switching control means for controlling the switchover of said governing and controlling device between the engine's diesel fuel operation mode and gaseous fuel operation mode, said mode switching control means being adapted to generate command signals for fully closing said gaseous fuel regulating valve when the engine is in the diesel fuel operation mode and for operating said diesel fuel injection pump to feed said diesel engine with a predetermined amount of a diesel fuel as pilot injection fuel when the engine is in the gaseous fuel operation mode; and (d) signal selecting means connecting said electronic governor means and said mode switching control means to said pair of electric actuator means for selectively delivering said control signal and said command signals, said signal selecting means being controlled by said mode switching control means so that when the engine is in the diesel fuel operation mode, said control signal is delivered to said electric actuator means connected with said diesel fuel injection pump to operate said pump and a command signal is delivered to said electric actuator means connected with gaseous fuel regulating valve to close said valve, while when the engine is in the gaseous fuel operation mode, said control signal is delivered to said electric actuator means connected with said gaseous fuel regulating valve and a command signal is delivered to said electric actuator means connected with said diesel fuel injection pump to operate said pump for the pilot injection;

(e) said automatic air-fuel ratio controller comprising a first valve opening sensor for sensing the opening of said gaseous fuel regulating valve, an intake air relief adjusting valve provided in an intake air relief port disposed between the outlet of said supercharger and the intake port of said diesel engine, said intake air relief adjusting valve being adapted to be actuated by an electric actuator, a second valve opening sensor adapted for sensing the opening of said intake air relief adjusting valve, and means for memorizing and calculating a predetermined relationship between the opening of said gaseous fuel regulating valve and said intake air relief adjusting valve, said memorizing and calculating means being further adapted to produce a signal for increasing and decreasing the opening of said intake air relief adjusting valve in response to the signal from said first valve opening sensor for sensing the opening of said gaseous fuel regulating valve.

3. In a gas-diesel dual fuel engine apparatus having a diesel engine, a diesel fuel supply system including a diesel fuel injection pump, a gaseous fuel supply system including a gaseous fuel regulating valve, a supercharger, an automatic air-fuel ratio controller, and a governing and controlling device for governing the speed of said engine through the control of fuel supplied to said engine and controlling the switchover of the operation of said engine between a diesel fuel mode and a gaseous fuel mode; the improvement that said governing and controlling device comprises:

(a) at lease one electronic governor means adapted to compare a speed signal representing the actual operating speed of said diesel engine with a set speed signal respresenting the set speed thereof and to perform a proportional plus integral plus differential operation on the basis of the difference therebetween for outputting a control signal according to the difference between said two speed signals;

(b) a pair of electric actuator means having respective power amplifier circuits and mechanically connected to said diesel fuel injection pump and said gaseous fuel regulating valve, respectively, for the actuation thereof;

(c) mode switching control means for controlling the switchover of said governing and controlling device between the engine's diesel fuel operation mode and gaseous fuel operation mode, said mode switching control means being adapted to generate command signals for fully closing said gaseous fuel regulating valve when the engine is in the diesel fuel operation mode and for operating said diesel fuel injection pump to feed said diesel engine with a predetermined amount of a diesel fuel as pilot injection fuel when the engine is in the gaseous fuel operation mode; and (d) signal selecting means connecting said electronic governor means and said mode switching control means to said pair of electric actuator means for selectively delivering said control signal and said command signals, said signal selecting means being controlled by said mode switching control means so that when the engine is in the diesel fuel operation mode, said control signal is delivered to said electric actuator means connected with said diesel fuel injection pump to operate said pump and a command signal is delivered to said electric actuator means connected with said gaseous fuel regulating valve to close said valve, while when the engine is in the gaseous fuel operation mode, said control signal is delivered to said electric actuator means connected with said gaseous fuel regulating valve and a command signal is delivered to said electric actuator means connected with said diesel fuel injection pump to operate said pump for the pilot injection;

(e) said automatic air-fuel ratio controller comprising a setting means for setting the rate of pilot injection of said diesel fuel and detection means for detecting said rate of pilot injection, a first valve opening sensor for sensing the opening of said gaseous fuel regulating valve, and intake air relief adjusting valve provided in an intake air relief port disposed between the outlet of said supercharger and the intake port of said diesel engine, said intake air relief adjusting valve being adapted to be actuated by an electric actuator, a second valve opening sensor adapted for sensing the opening of said intake air relief adjusting valve, and means for memorizing and calculating a predetermined relationship between the openings of said gaseous fuel regulating valve and said intake air relief adjusting valve, said memorizing and calculating means being further adapted to produce a signal for increasing and decreasing the opening of said intake air relief adjusting valve in response to the signal from said first valve opening sensor for sensing the opening of said gaseous fuel regulating valve.

* * * * *

UNITED STATES PATENT AND TRADEMARK OFFICE
CERTIFICATE OF CORRECTION

PATENT NO. : 4,576,137

DATED : March 18, 1986

INVENTOR(S) : Mitsuo Tanaka

It is certified that error appears in the above-identified patent and that said Letters Patent is hereby corrected as shown below:

Title Page, on the line referenced by Code [62], after "1982" delete --abandoned--.

Signed and Sealed this

Seventeenth Day of June 1986

[SEAL]

Attest:

DONALD J. QUIGG

Attesting Officer

Commissioner of Patents and Trademarks